(12) United States Patent
Hamouda et al.

(10) Patent No.: US 9,443,055 B2
(45) Date of Patent: Sep. 13, 2016

(54) METHODS FOR RETARGETING CIRCUIT DESIGN LAYOUTS AND FOR FABRICATING SEMICONDUCTOR DEVICES USING RETARGETED LAYOUTS

(71) Applicant: GLOBALFOUNDRIES, Inc., Grand Cayman (KY)

(72) Inventors: Ayman Hamouda, Fishkill, NY (US); Chidam Kallingal, Pleasanton, CA (US); Norman Chen, Poughkeepsie, NY (US)

(73) Assignee: GLOBALFOUNDRIES, INC., Grand Cayman (KY)

(*) Notice: Subject to any disclaimer, the term of this patent is extended or adjusted under 35 U.S.C. 154(b) by 0 days.

(21) Appl. No.: 14/699,705

(22) Filed: Apr. 29, 2015

(65) Prior Publication Data

US 2016/0188781 A1 Jun. 30, 2016

Related U.S. Application Data

(60) Provisional application No. 62/097,524, filed on Dec. 29, 2014.

(51) Int. Cl.
*G06F 17/50* (2006.01)
*G03F 1/36* (2012.01)

(52) U.S. Cl.
CPC ............. *G06F 17/5081* (2013.01); *G03F 1/36* (2013.01)

(58) Field of Classification Search
CPC .......... G06F 17/5081; G06F 1/36; G06F 7/70
USPC .............................. 716/50–55, 110, 119, 122
See application file for complete search history.

(56) References Cited

U.S. PATENT DOCUMENTS

2011/0197168 A1* 8/2011 Chen ................... G06F 17/5081
716/50

* cited by examiner

*Primary Examiner* — Paul Dinh
(74) *Attorney, Agent, or Firm* — Lorenz & Kopf, LLP

(57) ABSTRACT

Methods for retargeting a circuit design layout for a multiple patterning lithography process and for fabricating a semiconductor device are provided. In an exemplary embodiment, a computer-executed method for retargeting a circuit design layout for a multiple patterning lithography process is provided. The method includes decomposing a circuit design layout file to produce decomposed layout files in a computer. Each decomposed layout file is associated with a respective mask for use in the multiple patterning lithography process. The method includes preparing retargeted layout files in the computer by retargeting selected decomposed layout files based on photolithography limitations specific to each selected decomposed layout file to produce retargeted layout files. Also, the method includes determining in the computer that a combination of layout files includes a spacing conflict. The method further includes resolving the spacing conflict in the computer by modifying the layout file or layout files causing the spacing conflict.

14 Claims, 4 Drawing Sheets

METHODS FOR RETARGETING CIRCUIT DESIGN LAYOUTS AND FOR FABRICATING SEMICONDUCTOR DEVICES USING RETARGETED LAYOUTS

CROSS-REFERENCE TO RELATED APPLICATION

This Application claims the benefit of priority to U.S. Provisional Application Ser. No. 62/097,524, which was filed on Dec. 29, 2014, the contents of which are incorporated herein by reference in their entirety.

TECHNICAL FIELD

The technical field generally relates to semiconductor device design and manufacture, and more particularly relates to methods for retargeting circuit design layouts for multiple patterning processes and to methods for fabricating semiconductor devices using retargeted circuit design layouts.

BACKGROUND

When designing an integrated circuit including semiconductor devices, engineers or designers typically rely on computer design tools to help create an integrated circuit schematic or design, which can include a multitude of individual devices, such as transistors, coupled together to perform a certain function. To actually fabricate the integrated circuit device in or on a semiconductor substrate, the integrated circuit device schematic must be translated into a physical representation or layout, which itself can be transferred onto the surface of the semiconductor substrate. Computer-aided design (CAD) tools can be used to assist layout designers with translating the discrete circuit elements into shapes, which will embody the devices themselves in the completed integrated circuit device. These shapes make up the individual components of the circuit, such as gate electrodes, diffusion regions, metal interconnects and the like.

Software programs employed by the CAD tools to produce layout representations are typically structured to implement a set of predetermined design rules in order to produce a functional circuit. Often, the design rules are determined by certain processing and design limitations based roughly on the patternability of layout designs. For example, design rules may define the space tolerance between devices or interconnect lines. Typically, the formation of integrated circuit devices on a wafer relies on lithography processes. As is well known, lithography processes can be used to transfer a pattern of a photomask (also referred to as a mask or a reticle) to a wafer. For instance, patterns can be formed from a photoresist layer disposed on the wafer by passing light energy through a mask having an arrangement to image the desired pattern onto the photoresist layer.

There is a pervasive trend in the field of integrated circuit fabrication to increase the density with which various structures are arranged. For example, feature size, line width, and the separation between features and lines are becoming increasingly smaller. Yield of integrated circuit fabrication processes is affected by factors such as mask pattern fidelity, optical proximity effects and photoresist processing. Optical proximity correction (OPC) has been used to improve image fidelity. In general, current OPC techniques involve conducting computer simulations that take initial data sets having information relating the desired patterns and manipulate the data sets to arrive at corrected layouts or data sets in an attempt to compensate for the above-mentioned concerns. The photomask can then be made in accordance with the corrected layout. Briefly, the OPC process can be governed by a set of geometrical rules (e.g., "rule-based OPC" employing fixed rules for geometric manipulation of the data set), a set of modeling principles (e.g., "model-based OPC" employing predetermined behavior data to drive geometric manipulation of the data set) or a hybrid combination of rule-based OPC and model-based OPC.

Current methods provide corrected layouts in view of the overall lithography pattern. However, current methods are insufficient to effectively correct for all lithography weaknesses that may exist during translation of the integrated circuit device schematic into the physical representation or layout, especially in multiple patterning lithography processes that employ a plurality of individual masks and multiple exposures.

For example, certain current retargeting processes perform retargeting based on the overall combination or merger of decomposed layouts. An example of such a retargeting process is provided in FIG. 1. As shown, a circuit design layout 10 includes a pattern 12 of features 14. The pattern 12 is decomposed into a first decomposed layout 21 including first features 31, a second decomposed layout 22 including second features 32, and a third decomposed layout 23 including third features 33. In FIG. 1, the decomposed layouts are combined to form a combined layout 36. Then, based on the combined layout 36, a retargeting process is performed based on design rules for the combined layout 36. As a result, retargeted features 40 are defined in a retargeted combined layout 42.

Other retargeting processes may retarget each decomposed layout separately. However, such processes calculate the retargeting bias or adjustment based on the overall layout design rules. FIG. 2 illustrates such a retargeting process. In FIG. 2, process for decomposing the circuit design layout 10 is performed in accordance with the steps of FIG. 1 to form a first decomposed layout including first features 31, a second decomposed layout including second features 32, and a third decomposed layout including third features 33. In FIG. 2, the first features 31 are retargeted based on design rules for the overall layout pattern to form first retargeted features 41. Then, the second features 32 are retargeted based on design rules for the overall layout pattern 12 to form second retargeted features 42. Further, the third features 33 are retargeted based on design rules for the overall layout pattern 12 to form third retargeted features 43. While each set of features 31, 32 and 33 is retargeted separately, each is retargeted based on the overall layout pattern 12.

Accordingly, it is desirable to provide an improved method for retargeting a circuit design layout for a multiple patterning lithography process. In addition, it is desirable to provide method for fabricating a semiconductor device using such retargeted circuit design layouts. Furthermore, other desirable features and characteristics will become apparent from the subsequent detailed description and the appended claims, taken in conjunction with the accompanying drawings and the foregoing technical field and background.

BRIEF SUMMARY

In an exemplary embodiment, a computer-executed method for retargeting a circuit design layout for a multiple patterning lithography process is provided. The method includes decomposing a circuit design layout file to produce decomposed layout files in a computer. Each decomposed layout file is associated with a respective mask for use in the multiple patterning lithography process. The method includes preparing retargeted layout files in the computer by retargeting selected decomposed layout files based on photolithography limitations specific to each selected decomposed layout file to produce retargeted layout files. Also, the method includes determining in the computer that a combination of layout files includes a spacing conflict. The method further includes resolving the spacing conflict in the computer by modifying the layout file or layout files causing the spacing conflict.

In another embodiment, a computer-executed method for retargeting a circuit design layout for a multiple patterning lithography process includes decomposing a circuit design layout file to produce decomposed layout files in a computer. Each decomposed layout file is associated with a respective mask for use in the multiple patterning lithography process. Further, each decomposed layout file includes at least one feature. The method includes creating an estimated layout file in the computer for each decomposed layout file by estimating an adjustment for each feature therein based on a lithography process window of each feature relative to the respective decomposed layout file. The method also includes preparing retargeted layout files in the computer by retargeting each decomposed layout file based on the adjustments.

In yet another embodiment, a method for fabricating a semiconductor device is provided. The method includes decomposing a circuit design layout file to produce decomposed layout files. The retargeted layout files are prepared by retargeting each decomposed layout file based on photolithography limitations specific to each decomposed layout file. Further, a determination is made on whether a combination of the retargeted layout files includes spacing conflicts. Spacing conflicts are resolved by modifying selected retargeted layout files if spacing conflicts are present. The method further includes fabricating a plurality of masks based on the retargeted layout files. Further, the method includes performing a multiple patterning lithography process with the plurality of masks on a semiconductor substrate.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Methods for retargeting a circuit design layout for a multiple patterning lithography process are provided herein. The methods provide for altering the design geometry to increase lithography process robustness. Typically, a circuit design layout is decomposed such that features in the circuit design layout are broken up and apportioned to a plurality of decomposed layouts. Each decomposed layout provides the design for a single reticle or mask. Retargeting involves changing the feature width and inter-feature spacing in the decomposed layouts to improve the lithography process window of the decomposed layouts. The process window describes the process capability that matches the process requirements to guarantee an acceptable fabrication yield The retargeting methods described herein are litho-centric operations. Specifically, in the embodiments herein retargeting is performed on each decomposed layout, corresponding to a single specific mask or reticle, to adjust features therein. Stated differently, the retargeting methods described herein do not solely consider overall layout design rules, but rather adjust features based upon lithography weaknesses in individual decomposed layouts. While retargeting is performed based on individual decomposed layers, the process provides for awareness of adjacent features in the overall or combined layout that are included on other decomposed layouts. Therefore, many weaknesses in the individual decomposed layouts that manifest themselves as defects during hard mask opening or etching steps in the semiconductor device fabrication process that utilize multiple patterning are avoided. In this manner, the retargeting methods described herein address lithography weaknesses in specific decomposed layouts (or masks). Lithography weaknesses are locations where the lithography process is susceptible to process window variations (energy variations or focus variations, for example) where the lithography process may fail to print specific features, such as where a resist line or a resist space thins beyond the technology specifications.

Figure 1:
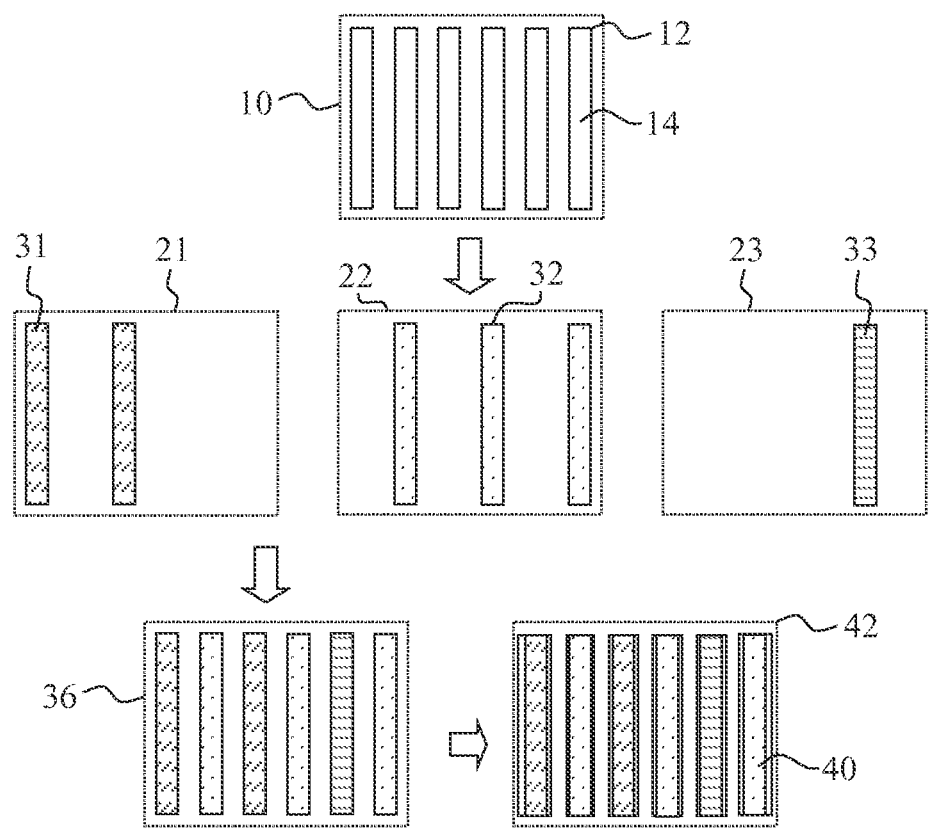
FIGS. 1 and 2 are schematic diagrams illustrating retargeted features formed according to prior art retargeting processes.
Figure 2:
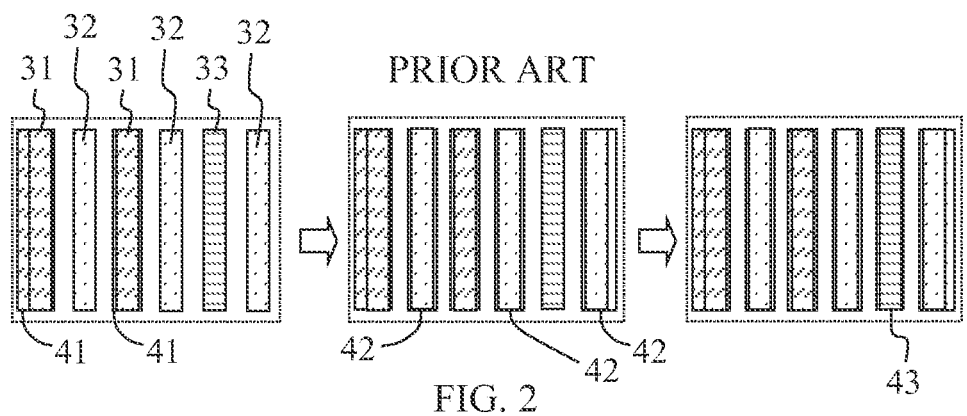
Figure 3:
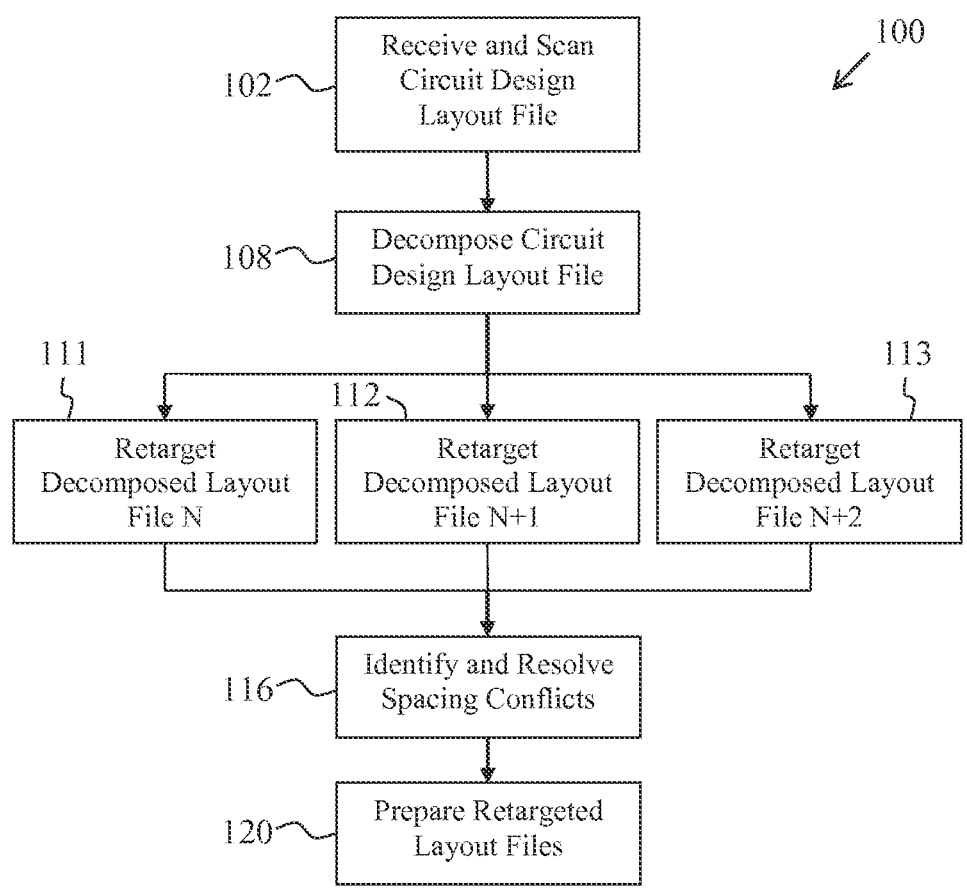
FIG. 3 is a flow chart illustrating a method for retargeting a circuit design layout for a multiple patterning lithography process in accordance with an exemplary embodiment.

FIG. 3 illustrates a method 100 in which retargeting is performed on each individual decomposed layout based on the process window of the respective decomposed layout, taking into consideration aspects or features of each decomposed layout that exhibit lithography weakness. Specifically, a lithography weakness in a particularly decomposed layout is addressed and compensated for, despite the absence of such weakness in the overall circuit design layout or combination of decomposed layouts. Each step in the method 100 may be performed by a computer (not illustrated) for evaluating layout designs of semiconductor devices, such that the method is computer-executed. An exemplary computer includes a processor in communication with storage that may include a hard disk, random access memory ("RAM") and/or removable storage, such as a magnetic disk or an optical disk. The exemplary storage may be encoded with an operating system, user interface software, and a design for manufacturing (DFM) application. The user interface software, in conjunction with a display, implements a user interface. The user interface may include peripheral I/O devices such as a keypad or keyboard, mouse, and the like. The exemplary processor runs under the control of the operating system, which may be any operating system known in the art. The DFM application is invoked by the operating system upon power up, reset, user interaction, etc., depending on the implementation of the operating system. The DFM application, when invoked, performs a method of the present subject matter. The user may invoke the DFM application in conventional fashion through the user interface. The data may reside on the same computer as the DFM application by which it is processed. Moreover, the DFM application may include multiple components that may reside on different computers. Some embodiments of the present subject matter may therefore be implemented on a distributed computing system with distributed storage and/or processing capabilities, which may be considered to form a computer.

It is contemplated that, in some embodiments, the DFM application may be executed by the computer to evaluate semiconductor device design data and retarget shapes in the layout to improve manufacturability by compensating for lithography weaknesses therein. Data for the DFM evaluation may be stored on a comp er readable storage device storage, disks, solid state storage, and the like).

Portions of the subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. These signals are also known as bits, values, elements, symbols, characters, terms, numbers, or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As shown, the method 100 includes receiving and scanning a circuit design layout file at step 102. The computer may have access to a library of pattern rules, which includes design rules for pattern checking and bias tables for retargeting. The design layout file is checked for design rule errors prior to the DFM analysis. The computer decomposes the circuit design layout file at step 108 into a plurality of decomposed layout files. Decomposition is the process of splitting adjacent design features into separate masks, and is used in advanced technology nodes where, if adjacent designs are not resolvable and include a pitch beyond the resolution limit, then the designs are split into separate masks in which each mask's features can be resolved robustly. Although the following description is illustrated using three decomposed layouts for the multiple patterning process, indicating the use of three masks or reticles for the patterning, it is contemplated that the techniques may be applied to any number of masks for the multiple patterning process.

At parallel steps 111, 112 and 113, retargeting is performed independently on each decomposed layout file in accordance with a correction or bias table. Each retargeting process at 111, 112 and 113 is performed in view of the specific attributes of the particular decomposed layout file. In general a bias table is employed to evaluate the features and their spacing relative to other features in their shared decomposed layout file. A width of a particular feature may be adjusted depending on its proximity to or isolation from another feature in the decomposed layout file.

Figure 4:
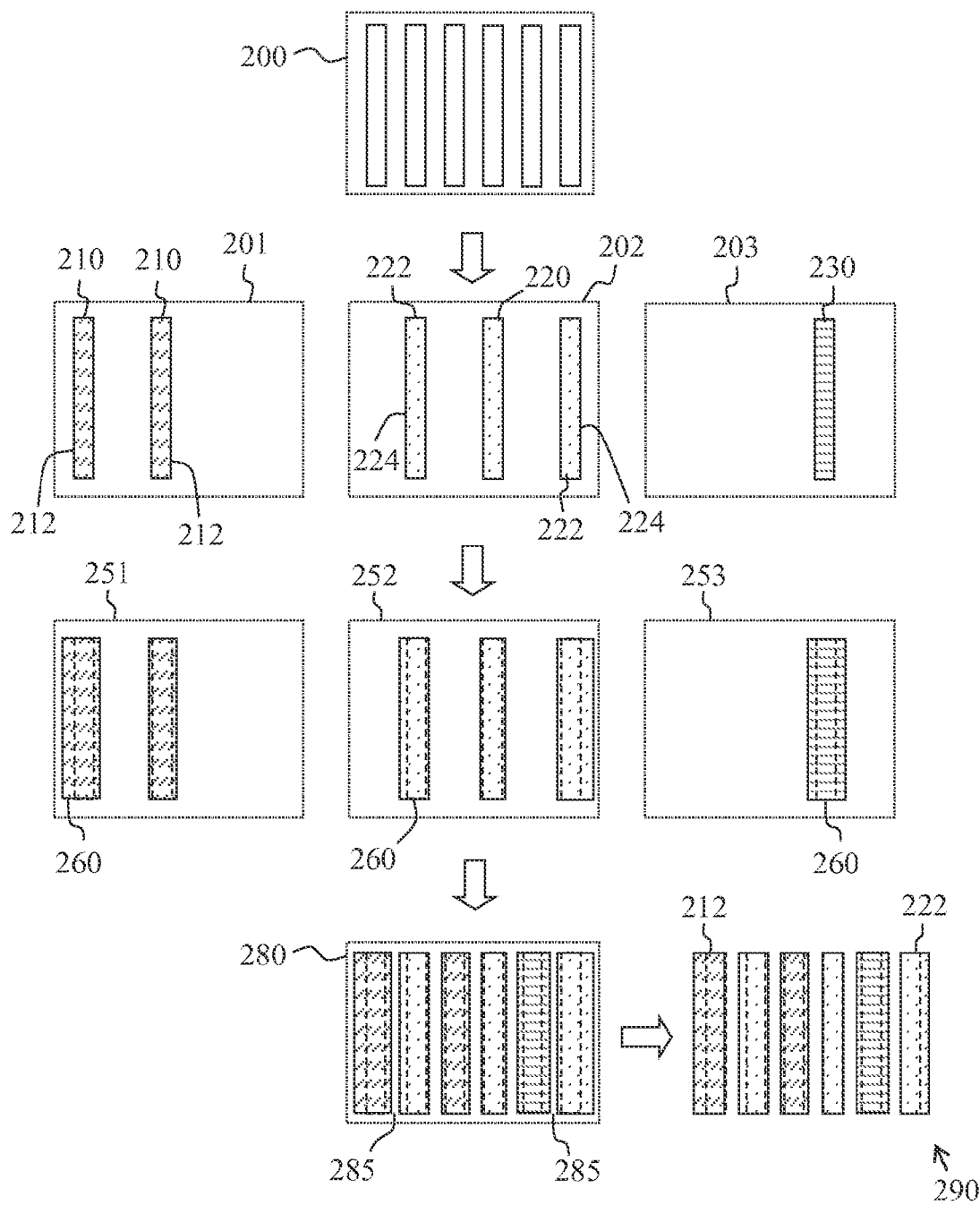
FIG. 4 is a schematic diagram illustrating exemplary features processed according to the method of FIG. 3.

Referring to FIG. 4, the implementation of the process steps of the method of FIG. 3 is illustrated. As shown, the integrated circuit design layout 200 is received and decomposed layouts 201, 202 and 203 are formed as a result of step 108. As may be seen in FIG. 4, decomposed layout 201 includes two terminal features 210. A terminal feature 210 includes a side 212 that does not face an adjacent feature 210. A side 212 that does not face an adjacent feature 210 may be considered to be an exposed side. In practice, the side 212 is separated from an adjacent feature 210 by a sufficient distance to be considered exposed. The distance may be based on the feature width and space (or pitch). During a lithography exposure using decomposed layout 201, the exposed sides 212 of terminal features 210 are identified as lithography weak, and require additional width or bias.

As can be seen with decomposed layout 202, a middle feature 220 lacks an exposed side that is not facing another feature. During a lithography exposure of decomposed layout 202, the middle feature 220 is not lithography weak and may not need additional width or bias. The terminal features 222 of decomposed layout 202 have exposed sides 224 that do not face an adjacent feature and may be considered lithography weak and provided with additional width in accordance with a correction table. Decomposed layout 203 includes an isolated feature 230, i.e., a single feature with no adjacent features. As such, each side of the isolated feature 230 is exposed. Such a feature is particularly lithography weak and may be provided with an increased or maximum additional width or bias.

Retargeted decomposed layouts 251, 252 and 253 are formed with retargeted features 260 as a result of steps 111, 112 and 113. In FIG. 4, the original feature shapes are shown in dashed lines. As illustrated, features with exposed sides in the decomposed layouts are provided with additional width while non-exposed sides are provided with less additional or no additional width.

Referring back to FIG. 3, after the retargeting steps 111, 112 and 113 are performed the method continues with identifying and resolving any spacing conflicts between adjacent features at step 116. For example, as shown in FIG. 4, the combination 280 of retargeted decomposed layouts 251, 252 and 253 is analyzed for spacing conflicts. Retargeted features that have increased width in the direction of an adjacent feature may be particularly susceptible to spacing conflicts. A spacing conflict is defined as too narrow of a space between adjacent features. Tip-to-tip spacing, line-to-line spacing, and tip-to-line spacing may be analyzed to determine whether there is a spacing conflict.

Step 116 of FIG. 3 identifies spacing conflicts 285 as shown in FIG. 4. Spacing conflicts 285 may be resolved by increasing the spacing between the features as issue. For example, an equal violation retract process may be performed in which additional width may be removed equally from each of the adjacent features until sufficient space between the adjacent features is attained. Alternatively, a table-based conflict resolution biasing process may be performed in which a table provides a conflict resolution protocol to remove desired amounts of the additional width from one or both of the adjacent features.

Step 116 of FIG. 3 is performed to resolve the spacing conflicts 285 In FIG. 4 by removing width from the non-exposed sides of terminal feature 212 and terminal feature 222 to establish sufficient spacing to the adjacent features to produce retargeted features. Retargeted features 290 are shown in FIG. 4 with sufficient inter-feature spacing and with appropriate biasing or additional width to provide for robust multiple patterning processing. By retargeting, the computer changes the widths of various design features to increase manufacturability. Upon resolution of the spacing conflicts, the retargeted layout files are prepared at step 120 in FIG. 3.

Figure 5:
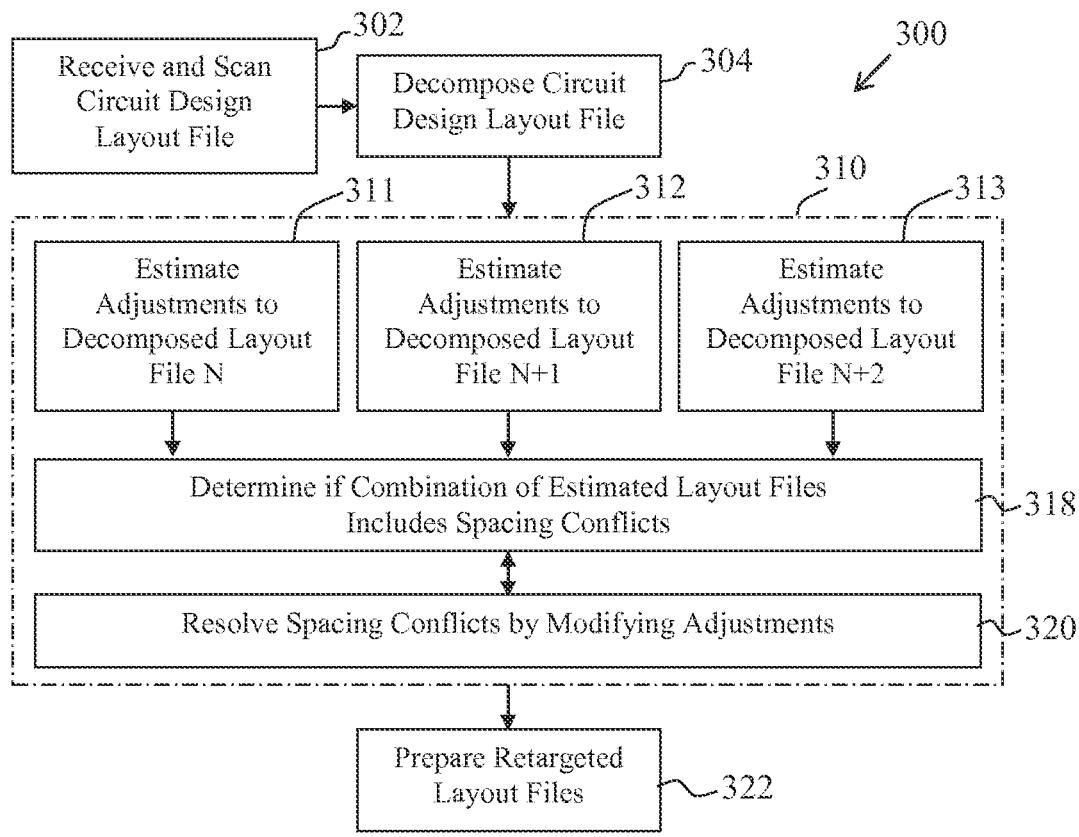
FIG. 5 is a flow chart illustrating a method for retargeting a circuit design layout for a multiple patterning lithography process in accordance with another exemplary embodiment.

FIG. 5 illustrates a method 300 for retargeting individual decomposed layouts based on the process window of the respective decomposed layout. Specifically, a lithography weakness in a particularly decomposed layout is addressed and compensated for, despite the absence of such weakness in the circuit design layout or combination of decomposed layouts. Each step in the method 300 may be performed by a computer as described above. At step 302, the circuit design layout file is received and scanned. The design layout file may be checked for design rule errors. The computer decomposes the circuit design layout file at step 308 into a plurality of decomposed layout files. Although the following description is illustrated using three decomposed layouts for the multiple patterning process, indicating the use of three masks or reticles for the patterning, it is contemplated that the techniques may be applied to any number of masks for the multiple patterning process.

At block 310, the computer simultaneously retargets all decomposed layout files while maintaining minimum space and width requirements. As shown, parallel steps 311, 312 and 313 provide for independently estimating adjustments to the decomposed layout files as described above to compensate for features with weak lithography. Unlike the embodiment of FIG. 3, steps 311, 312 and 313 are performed on the respective decomposed layouts with knowledge and consideration of the other decomposed layouts and the combination of decomposed layouts. Specifically, simultaneous and in conjunction with steps 311, 312 and 313, the computer determines if the combination of estimated layout files includes spacing conflicts at step 318. If the estimated layout files present spacing conflicts, the spacing conflicts are resolved at step 320 by modifying the adjustments estimated in steps 311, 312 and 313. Steps 311, 312, 312, 318 and 320 are performed simultaneously and in conjunction with one another such that retargeting adjustments for each decomposed layout file requiring no further modification are provided by block 310.

Figure 6:
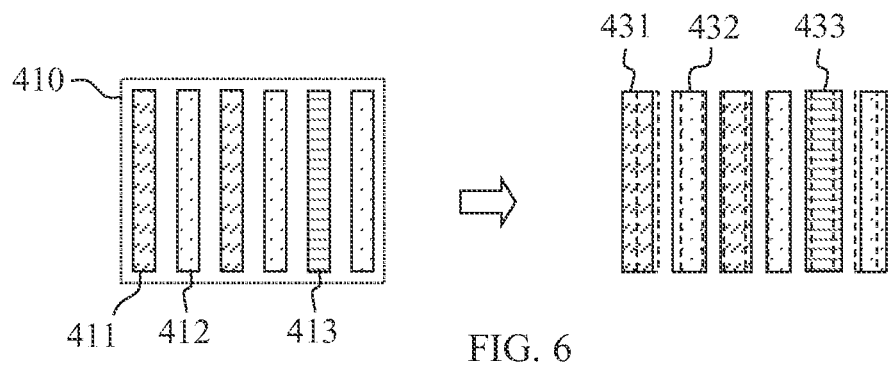
FIG. 6 is a schematic diagram illustrating exemplary features processed according to the method of FIG. 5.

Thus, adjustments to the decomposed layout files are provided without spacing conflicts. At step 322, the retargeted layout files are prepared without requiring any further spacing conflict checks. FIG. 6 illustrates the retargeting of features according to the method of FIG. 5. As in previous embodiments, a combined decomposed layout 410 includes features 411, 412 and 413 belonging to different decomposed layouts. Features 411, 412 and 413 are illustrated in a combination 410 of decomposed layouts because the retargeting process of FIG. 5 considers, in addition to the feature arrangement on each decomposed layout (similar to the embodiment of FIG. 3), the features of the other decomposed layouts when combined. Block 310 provides a single step formation of the retargeted features 431, 432, and 433. As shown, retargeted features 431, 432, and 433 do not violate any design rules nor include spacing conflicts.

Retargeting integrated circuit device layouts using the techniques described herein allows improvements in manufacturability of the layout for a multiple patterning process. Specifically, features are analyzed and retargeted on both a decomposed layout level and a combined decomposed layout (or overall circuit design layout) level. As a result, features that are lithography weak based on position within a decomposed layout are retargeted to provide a sufficient process window for the photolithography exposure.

The retargeted layout files provided according to the methods of FIGS. 3-6 may be used to fabricate semiconductor devices using a multiple patterning process. Specifically, a mask or reticle is manufactured for each retargeted layout file. Then, the masks are used in sequential lithographic exposure processes to transfer the circuit design layout to a semiconductor substrate.

While at least one exemplary embodiment has been presented in the foregoing detailed description, it should be appreciated that a vast number of variations exist. For example, although the subject matter may be described herein in the context of conformal deposition and anisotropic etch processes, practical embodiments of the fabrication processes described herein may utilize other types of deposition and etch processes (e.g., a non-conformal deposition in lieu of a conformal deposition or an isotropic etchant in lieu of an anisotropic etchant). In this regard, it will be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-executed method for retargeting a circuit design layout including a pattern of features for a multiple patterning lithography process, the method comprising:

decomposing a circuit design layout file to produce decomposed layout files in a computer, wherein each decomposed layout file includes a feature having an initial width, and wherein each decomposed layout file is associated with a respective mask for use in the multiple patterning lithography process;

retargeting at least one decomposed layout file based on photolithography limitations of the at least one decomposed layout file to produce at least one retargeted layout file with a retargeted feature having a retargeted width greater than the initial width;

determining in the computer that a combination of layout files includes a spacing conflict; and resolving the spacing conflict in the computer by modifying the layout file or layout files causing the spacing conflict to have a modified feature with a modified width less than the retargeted width, wherein the at least one retargeted layout file in the circuit design layout is used for fabricating semiconductor devices.

2. The computer-executed method of claim 1 wherein:
a first decomposed layout file includes a terminal feature having a terminal side and a non-terminal side; and
retargeting the first decomposed layout file comprises increasing the width of the terminal feature in the first decomposed layout file to form a retargeted terminal feature; and
resolving the spacing conflict comprises modifying the first decomposed layout file to modify the non-terminal side of the terminal feature and to retain the terminal side of the terminal feature.

3. The computer-executed method of claim 1 wherein:
the first decomposed layout file includes a terminal feature and a non-terminal feature; and
retargeting the first decomposed layout file comprises making a greater increase to the width of the terminal feature than to the width of the non-terminal feature.

4. The computer-executed method of claim 1 wherein:
the first decomposed layout file includes isolated features and non-isolated features; and
retargeting the first decomposed layout file comprises making a greater increase to the widths of the isolated features than to the widths of the non-isolated features.

5. The computer-executed method of claim 1 wherein determining that the combination of layout files includes a spacing conflict comprises analyzing whether adjacent features in the combination of layout files violate a minimum spacing between the adjacent features in the combination of layout files.

6. The computer-executed method of claim 5 wherein resolving the spacing conflict comprises modifying the layout file or layout files causing the spacing conflict using equal violation retract.

7. The computer-executed method of claim 5 wherein resolving the spacing conflict comprises modifying the layout file or layout files causing the spacing conflict using conflict resolution tables.

8. A computer-executed method for retargeting a circuit design layout for a multiple patterning lithography process, the method comprising:
decomposing a circuit design layout file to produce decomposed layout files in a computer, wherein each decomposed layout file is associated with a respective mask for use in the multiple patterning lithography process;
retargeting at least one decomposed layout file based on photolithography limitations of the at least one decomposed layout file to produce at least one retargeted layout file;
determining in the computer that a combination of layout files includes a spacing conflict; and
resolving the spacing conflict in the computer by modifying the layout file or layout files causing the spacing conflict using conflict resolution tables, wherein the at least one retargeted layout file in the circuit design layout is used for fabricating semiconductor devices.

9. The computer-executed method of claim 8 wherein:
the circuit design layout file includes a pattern of features;
each decomposed layout file includes a feature; and
retargeting a first decomposed layout file comprises adjusting a width of a respective feature in the first decomposed layout file to form an adjusted feature.

10. The computer-executed method of claim 9 wherein:
the first decomposed layout file includes a terminal feature and a non-terminal feature; and
retargeting the first decomposed layout file comprises making a greater adjustment to the width of the terminal feature than to the width of the non-terminal feature.

11. The computer-executed method of claim 8 wherein:
the first decomposed layout file includes a terminal feature and a non-terminal feature; and
retargeting the first decomposed layout file comprises making a greater increase to the width of the terminal feature than to the width of the non-terminal feature.

12. The computer-executed method of claim 8 wherein:
the first decomposed layout file includes isolated features and non-isolated features; and
retargeting the first decomposed layout file comprises making a greater adjustment to the widths of the isolated features than to the widths of the non-isolated features.

13. The computer-executed method of claim 8 wherein:
the first decomposed layout file includes isolated features and non-isolated features; and
retargeting the first decomposed layout file comprises making a greater increase to the widths of the isolated features than to the widths of the non-isolated features.

14. The computer-executed method of claim 8 wherein determining that the combination of layout files includes a spacing conflict comprises analyzing whether adjacent features in the combination of layout files violate a minimum spacing between the adjacent features in the combination of layout files.

* * * * *